(12) United States Patent
Blackburn

(10) Patent No.: US 8,033,498 B2
(45) Date of Patent: Oct. 11, 2011

(54) HELICOPTER

(76) Inventor: Donald George Blackburn, Ceredigion (GB)

( * ) Notice: Subject to any disclaimer, the term of this patent is extended or adjusted under 35 U.S.C. 154(b) by 13 days.

(21) Appl. No.: 11/988,250

(22) PCT Filed: Jun. 26, 2006

(86) PCT No.: PCT/GB2006/002355
§ 371 (c)(1),
(2), (4) Date: Jan. 3, 2008

(87) PCT Pub. No.: WO2007/007029
PCT Pub. Date: Jan. 18, 2007

(65) Prior Publication Data
US 2009/0121076 A1   May 14, 2009

(30) Foreign Application Priority Data
Jul. 8, 2005   (GB) .................................. 0514034.8

(51) Int. Cl.
*B64C 27/08* (2006.01)
(52) U.S. Cl. ...................... 244/17.23; 244/7 B; 244/7 C
(58) Field of Classification Search .................. 244/12.2, 244/17.19, 17.23, 23 R, 23 C, 7 A, 7 B, 7 C, 244/17.11, 17.21, 17.27, 6, 9, 73 C, 12.4
See application file for complete search history.

(56) References Cited

U.S. PATENT DOCUMENTS

| | | | | |
|---|---|---|---|---|
| 1,132,049 A | | 3/1915 | Waller | |
| 1,350,454 A | * | 8/1920 | Hewitt | 416/129 |
| 1,360,933 A | | 11/1920 | Griffin | |
| 1,414,410 A | * | 5/1922 | Haupt | 416/200 R |
| 1,705,489 A | * | 3/1929 | Mladinich | 244/17.15 |
| 1,838,248 A | * | 12/1931 | Bourland | 244/17.23 |
| 2,111,988 A | * | 3/1938 | Percival | 244/17.21 |
| 2,806,662 A | * | 9/1957 | Yonkers | 244/17.19 |
| 2,947,496 A | * | 8/1960 | Leggett | 244/12.2 |
| 2,948,490 A | * | 8/1960 | Munoz | 244/17.19 |
| 2,996,269 A | | 8/1961 | Parry | |
| 3,018,984 A | * | 1/1962 | Rust | 244/17.19 |
| 3,041,012 A | * | 6/1962 | Gibbs | 244/17.23 |
| 3,096,953 A | * | 7/1963 | Koump | 244/17.19 |
| 3,103,327 A | * | 9/1963 | Parry | 244/52 |
| 3,507,461 A | * | 4/1970 | Rosta | 244/17.23 |
| 3,722,830 A | * | 3/1973 | Barber | 244/17.23 |
| 3,838,835 A | * | 10/1974 | Kling | 244/23 C |
| 3,884,431 A | * | 5/1975 | Burrell | 244/7 A |
| 4,184,654 A | * | 1/1980 | Herrera | 244/8 |
| 4,296,892 A | * | 10/1981 | Barge | 244/2 |

(Continued)

FOREIGN PATENT DOCUMENTS
GB           06416           1/1911

*Primary Examiner* — Tien Dinh
*Assistant Examiner* — Justin Benedik
(74) *Attorney, Agent, or Firm* — Iandiorio Teska & Coleman

(57) ABSTRACT

A helicopter (2) comprising a body portion (4), a plurality of rotor blades (6) which are mounted for rotation with respect to the body portion (4), and a fan (8) which is mounted for rotation in an opposite direction to the direction of rotation of the rotors (6), the rotor blades (6) being such that they are spaced apart in a vertical direction, and the fan (8) being such that when it rotates it generates a torque which acts to counteract at least a part of the torque generated by the rotor blades (6) when they rotate.

16 Claims, 1 Drawing Sheet

U.S. PATENT DOCUMENTS

Figure 1:
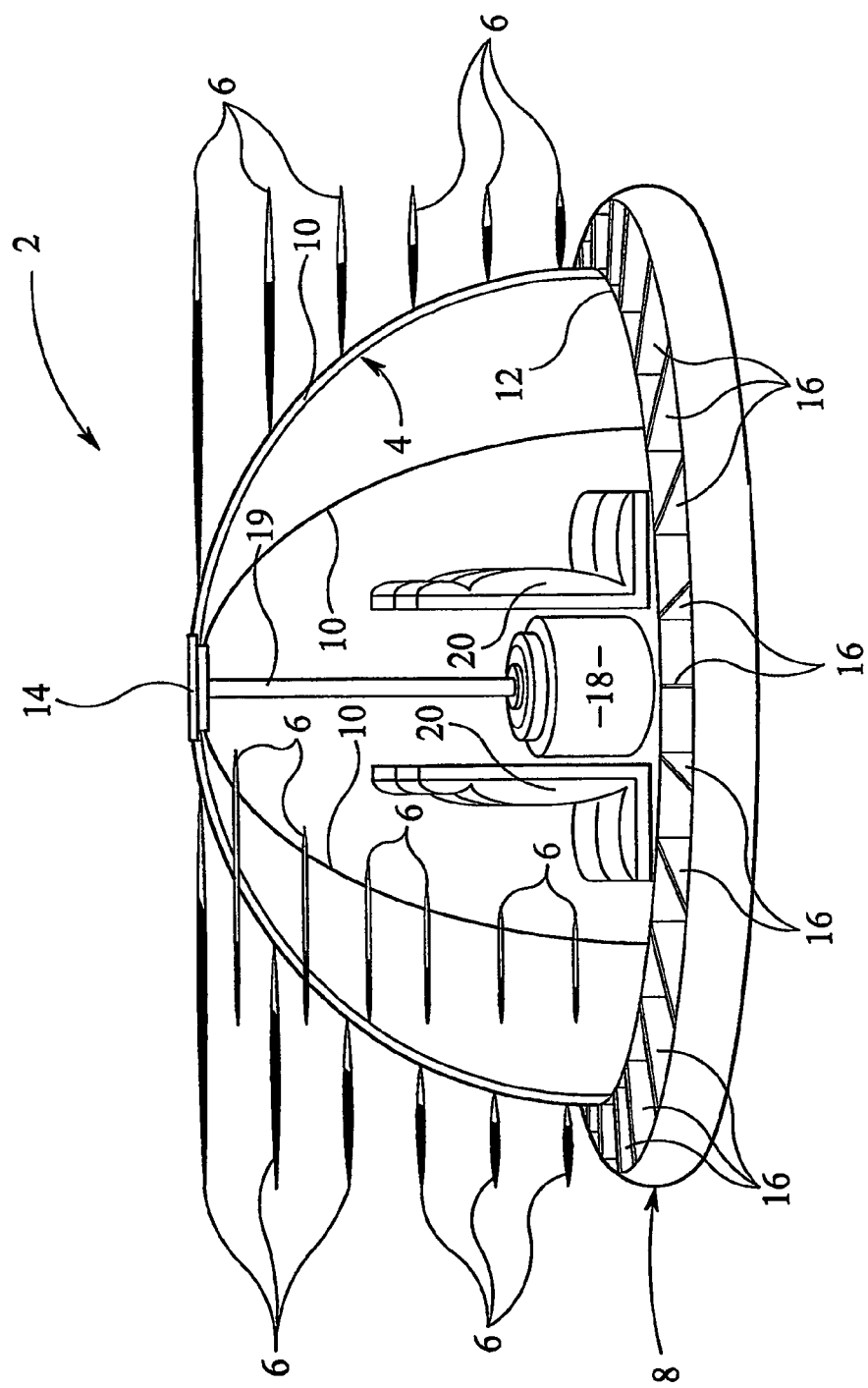

| | | | |
|---|---|---|---|
| 4,589,611 A * | 5/1986 | Ramme et al. | 244/6 |
| 4,606,515 A * | 8/1986 | Hickey | 244/29 |
| D312,067 S * | 11/1990 | Walling | D12/325 |
| D430,530 S * | 9/2000 | Milde, Jr. | D12/325 |
| 6,179,247 B1 * | 1/2001 | Milde, Jr. | 244/23 A |
| 6,886,777 B2 * | 5/2005 | Rock | 244/17.23 |
| 2004/0144892 A1 * | 7/2004 | Gerbino | 244/17.11 |
| 2004/0179941 A1 | 9/2004 | Negulescu | |
| 2005/0067527 A1 * | 3/2005 | Petersen | 244/17.11 |

\* cited by examiner

HELICOPTER

This invention relates to a helicopter.

Known helicopters have large rotor blade spans. These rotor blade spans may exceed twenty five feet. This means that the helicopters require relatively large spaces in which to land. The known helicopters are also expensive to manufacture, and also expensive to maintain and run due to high continuous engine speeds. The above problems are particularly acute for helicopters for private use, which helicopters are often purchased as home-build helicopters for being constructed by private persons.

It is an aim of the present invention to reduce the above mentioned problems.

A helicopter comprising a body portion, a plurality of spars, a plurality of rotor blades which are mounted for rotation with respect to the body portion, and a fan which is mounted for rotation in an opposite direction to the direction of rotation of the rotor blades, and the helicopter being such that the rotor blades are spaced apart in a vertical direction, the rotor blades provide lift for the helicopter, the fan is positioned around a base part of the body portion such that the fan does not intrude on space inside the body portion and on outlook from the body portion, and the fan rotates in use to generate a torque which acts to counteract at least a part of the torque generated by the rotor blades when they rotate, the rotor blades are in a plurality of vertical sets, each vertical set has its rotor blades mounted on one only of the spars, the spars rotate in use to cause the rotation of the rotor blades mounted on the spars, and the spars curve inwardly from the base part of the body portion to a top part of the body portion.

With the helicopter of the present invention, the rotor blade span is able to be drastically reduced due to the use of the plurality of rotor blades which are spaced apart in a vertical direction. Thus the required helicopter lift is able to be obtained with shorter rotor blades than would normally be the case with rotor blades extending only in a horizontal direction. With the helicopter of the present invention, the engine is able to run at a much lower speed, for example less than half of the speed of a conventional known helicopter. This enables the helicopter of the present invention to have low maintenance costs and low running costs. The helicopter may also be constructed so that it can be produced at a significantly lower cost than known helicopters, for example one third of the cost of existing kits for producing home-build helicopters of a comparable size.

The helicopter may be one in which the rotor blades are in a plurality of vertical sets. There may be four-eight of the vertical sets. Preferably there are six of the vertical sets.

Preferably, the spars are connected together at a top part of the body portion.

The helicopter may include control rods for the rotor blades, the control rods being positioned inside the spars. Control means other than control rods for the rotor blades may be employed. The control means, for example the control rods, may be positioned outside the spars if desired.

There may be four-eight rotor blades in each vertical set. Preferably there are six rotor blades in each vertical set.

Preferably, the helicopter is one in which the rotor blades in each vertical set are of different lengths, and in which the rotor blades in each vertical set progressively increase in length, with the shortest rotor blade being adjacent the base part of the body portion.

The fan will usually have a plurality of fan blades which extend in the vertical direction.

Preferably, the fan generates a torque which counteracts substantially all of the torque generated by the rotor blades when they rotate. In this case, the fan may advantageously have the same number of fan blades as there are rotor blades.

The helicopter may include drive means for driving the rotor blades and the fan. The drive means may drive a vertically extending shaft. The shaft may connect to and drive the spars, when the spars are present.

The helicopter may operate such that the drive means is coupled to the spars by a awash plate assembly. The purpose of the swash plate assembly is to enable the pitch of the rotor blades to be varied.

Under the direction of the collective control from the awash plate, the angles, of all the rotor blades are able to be changed simultaneously, thus increasing or decreasing the lift that the rotor blades provide.

Under the direction of the cyclic control from the swash plate, the awash plate assembly is able to change the angle of the rotor blades on a group of spars, thus allowing the pitch of the helicopter to be altered. This alteration of pitch enables a full 360° movement forward-backward-left-right. The spars may be retained at the base part of the body portion in a ring that runs in circumferential bearings attached to the base part.

The fan may be coupled to the drive means by six spokes set at 60° Intervals from a central drive hub beneath the base part. The fan blades have inner edges which may be retained in a ring that runs in circumferential bearings attached to the base part. The control means is carried within the spokes to the blades of the fan. At the hub, a similar swath plate assembly may be provided in order to enable the pitch from the fan blades to be altered.

The swash plate assembly preferably consists of two plates, one fixed and the other rotating. The rotating plate rotates with the drive shaft and the rotor blades, due to connecting links between the rotating plate and the drive shaft.

Pitch control rods may enable the rotating plate to change the pitch of the rotor blades.

The angle of the fixed swash plate may be varied by another set of control rods attached to the fixed plate. The control rods of the fixed plate are controlled by the pilot's controls. There will usually be bearings employed between the two plates. Raising or lowering the fixed plate alters the collective pitch of the rotor blades. By tilting the fixed plate, the cyclic pitch is altered.

The helicopter may include seating in the body portion. Preferably, the seating is for four persons. This compares favourably with the seating in present home-build helicopters which are usually only capable of carrying a maximum of two persons.

The body portion may have transparent walls. Persons in the helicopter are thus able to be given a good 360° view. Although the helicopter of the present invention is able to operate such that the drive means operates at a much lower speed compared with the drive means in known helicopters, the reduced speed of the rotating rotor blades and the rotating spars does not adversely impede visibility of the operator of the aircraft.

The helicopter of the present invention may employ conventional helicopter controls. Cyclic and collective control may be achieved by the control rods or other control means. The helicopter of the present invention will usually employ conventional throttle controls.

The helicopter may have conventional skids. These skids may be employed on four angled sprung legs. Alternatively, the helicopter may have three castored double wheels set at 120° radially beneath the helicopter. The castored double wheels may be helpful in maneuvering the helicopter when it is on the ground.

An embodiment of the invention will now be described solely by way of example and with reference to the accompanying drawing.

Referring to the drawing, there is shown a helicopter 2 comprising a body portion 4, and a plurality of rotor blades 6 which are mounted for rotation with respect to the body portion 4. A fan 8 is mounted for rotation in an opposite direction to the direction of rotation of the rotor blade 6. The rotor blades 6 are such that they are spaced apart in a vertical direction. The fan 8 is positioned around a base part 12 of the body portion 4. The fan 8 is such that when it rotates, it generates a torque which acts to counteract at least a part of the torque generated by the rotor blades 8 when they rotate.

As can be seen from the drawing, the rotor blades 6 are in a plurality of vertical sets. There are six rotor blades 6 in each vertical direction.

The rotor blades 6 in each vertical set are mounted on a spar 10. Each spar 10 rotates to cause rotation of the rotor blades 8 mounted on the spar 10. The spar 10 for each set of rotor blades 6 curves inwardly from the base part 12 of the body portion 4 towards a top part 14 of the body portion 4.

The spars 10 are connected together at the top part 14 of the body portion 4.

The helicopter includes control rods (not shown) for the rotor blades 6. The control rods are positioned inside the spars 10.

As can be seen from the drawing, the six rotor blades 6 in each vertical set of the rotor blades are such that they are each of a different length. More specifically, the rotor blades 6 in each vertical set progressively increase in length, with the shortest rotor blade 6 being adjacent the base part 12 of the body portion 4. Thus the longest rotor blade 8 is adjacent the top part 14 of the body portion 4.

The fan 8 has a plurality of fan blades 16. The fan blades 16 extend in the horizontal direction. The fan 8 is such that it generates a torque which acts to counteract substantially all of the torque generated by the rotor blades 6 when they rotate. The fan 8 is provided with the same number of fan blades 16 as there are rotor blades 6. Other fan designs may be used to ensure that the fan 8 generates a torque which counteracts substantially all of the torque generated by the rotor blades 6 when they rotate. The fan blades 16 may also act to give some lift to the helicopter 2, this lift being supplementary to the main lift for the helicopter 2 which is caused by the rotor blades 8.

The helicopter 2 includes drive means 18 for driving the rotor blades 6 and the fan 8. The drive means 18 drives a vertically extending rotating shaft 19. This drive shaft 19 may extend from the drive means 18 vertically to the top part 14 of the body portion 4, where the drive shaft 19 will make driving contact with the top parts of the spars 10.

The helicopter includes seating in the form of seats 20 in the body portion 4. There are preferably seats for four persons.

The body portion 4 has transparent walls, in order to give persons sitting on the seats 20 good 360° visibility.

The helicopter 2 is mainly intended as home-build helicopter and it may be sold in home-build kit form. The cost of the helicopter 2 may be approximately one third of the cost of an existing kit for building a generally comparable known helicopter. The helicopter 2 may have low maintenance costs because the drive means 18 is able to run at a much lower speed than the drive means in conventional helicopters. Thus, for example, the drive means may have a motor which runs at less than half of the speed in a conventional helicopter. The low running speed of the drive means 18 gives low maintenance costs and low running costs.

The rotor blades 6 may be such that there are six rotor blades which are five feet in length, six rotor blades which are four feet in length, six rotor blades which are three feet in length, six rotor blades which are two feet in length, six rotor blades which are one foot in length, and six rotor blades which are 0.5 feet in length. This gives a total rotor blade length of 93 feet. Inspite of this, the helicopter 2 only has an overall diameter of twelve feet. Thus the helicopter 2 is able to land and operate in relatively small spaces, which is a big advantage for home-build helicopters which are used privately and which often land and take off in gardens or around persons' homes. By way of comparison, a known helicopter might have a wing span of more than twenty-five feet. The helicopter 2 is thus able to be significantly smaller in size. The helicopter 2 is also able to be built at a significantly lower cost than a known comparable helicopter. In addition, the majority of known home-build helicopters are only able to carry two persons, whereas the helicopter 2 can carry four persons if desired. Due to the very large rotor blade area afforded by the rotor blades 6, the drive means 18 is able to operate at the lower speed, and thereby provide the further advantages of low maintenance costs and low running costs.

Although not shown in the drawing, the helicopter 2 has three castored double wheels set at 120° radially beneath the helicopter 2.

It is to be appreciated that the embodiment of the invention described above with reference to the accompanying drawing has been given by way of example only and that modifications may be effected. Thus, for example, more or less rotor blades than six rotors rotor blades may be employed on each spar, and more or less spars may be employed than six spars. The helicopter 2 may be increased in size to act as a passenger carrier, in which case the seating will than be for more than four persons.

The invention claimed is:

1. A helicopter comprising a body portion, a plurality of spars, a plurality of rotor blades which are mounted for rotation with respect to the body portion, and a fan which is mounted for rotation in an opposite direction to the direction of rotation of the rotor blades, and the helicopter being such that the rotor blades are spaced apart in a vertical direction, the rotor blades provide lift for the helicopter, the fan is positioned around a base part of the body portion such that the fan does not intrude on space inside the body portion and on outlook from the body portion, and the fan rotates in use to generate a torque which acts to counteract at least a part of the torque generated by the rotor blades when they rotate, the rotor blades are in a plurality of vertical sets, each vertical set has its rotor blades mounted on one only of the spars, the spars rotate in use to cause the rotation of the rotor blades mounted on the spars, and the spars curve inwardly from the base part of the body portion to a top part of the body portion.

2. A helicopter according to claim 1 in which there are four-eight of the vertical sets.

3. A helicopter according to claim 2 in which there are six of the vertical sets.

4. A helicopter according to claim 1 in which the spars are connected together at the top part of the body portion.

5. A helicopter according to claim 1 and including control rods for the rotor blades, and in which there is a said control rod positioned inside each said spar.

6. A helicopter according to claim 1 in which there are four-eight rotor blades in each vertical set.

7. A helicopter according to claim 6 in which there are six rotor blades in each vertical set.

8. A helicopter according to claim 1 in which the rotor blades in each vertical set are of different lengths, and in which the rotor blades in each vertical set progressively increase in length, with the shortest rotor blade being adjacent to the base part of the body portion.

9. A helicopter according to claim 1 in which the fan has a plurality of blades, and in which the fan blades extend in the vertical direction.

10. A helicopter according to claim 1 in which the fan generates a torque which acts to counteract substantially all of the torque generated by the rotor blades when they rotate.

11. A helicopter according to claim 9 in which the fan has the same number of fan blades as there are rotor blades.

12. A helicopter according to claim 1 and including drive means for driving the rotor blades and the fan.

13. A helicopter according to claim 12 in which the drive means drives a vertically extending rotating shaft.

14. A helicopter according to claim 1 and including seating in the body portion.

15. A helicopter according to claim 14 in which the seating is for four persons.

16. A helicopter according to claim 1 in which the body portion has transparent walls.

* * * * *